(12) United States Patent
Lefevre et al.

(10) Patent No.: US 12,713,165 B2
(45) Date of Patent: Aug. 18, 2026

(54) MODULATION FORMATS IN OPTICAL NETWORKS

(71) Applicant: Nokia Solutions and Networks Oy, Espoo (FI)

(72) Inventors: Yannick Lefevre, Antwerp (BE); Michiel Verplaetse, Antwerp (BE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 453 days.

(21) Appl. No.: 18/347,755

(22) Filed: Jul. 6, 2023

(65) Prior Publication Data

US 2024/0015424 A1 Jan. 11, 2024

(30) Foreign Application Priority Data

Jul. 6, 2022 (EP) .................................... 22183360

(51) Int. Cl.
*H04B 10/516* (2013.01)
*H04Q 11/00* (2006.01)

(52) U.S. Cl.
CPC ..... *H04Q 11/0067* (2013.01); *H04B 10/5161* (2013.01); *H04Q 11/0003* (2013.01); *H04Q 2011/0083* (2013.01); *H04Q 2011/0084* (2013.01); *H04Q 2011/0086* (2013.01)

(58) Field of Classification Search
CPC ........................ H04B 10/5161; H04Q 11/0067
See application file for complete search history.

(56) References Cited

U.S. PATENT DOCUMENTS

| | | | |
|---|---|---|---|
| 9,673,907 B1 * | 6/2017 | Vassilieva ........ | H04B 10/07953 |
| 2013/0265444 A1 | 10/2013 | Walsh et al. | |
| 2016/0105236 A1 | 4/2016 | Zhang et al. | |
| 2019/0165857 A1 * | 5/2019 | Rafique ................. | H04L 5/0044 |
| 2022/0416904 A1 * | 12/2022 | You ....................... | H04L 1/0005 |
| 2024/0048237 A1 * | 2/2024 | Feng .................. | H04B 10/0795 |

(Continued)

OTHER PUBLICATIONS

ITU-T G.989 (Oct. 2015), “Series G: Transmission Systems and Media, Digital Systems and Networks, Digital sections and digital line system—Optical line systems for local and access networks,” International Telecommunication Union, ITU-T G-Series Recommendations.

(Continued)

*Primary Examiner* — Nathan M Cors
(74) *Attorney, Agent, or Firm* — Harness, Dickey & Pierce, P.L.C.

(57) ABSTRACT

An optical line terminal (OLT) is configured to communicate with optical network units (ONUs) in a passive optical network. The downstream transmission from the OLT to the ONUs are organized in frames including segments, wherein a respective segment is modulated according to at least a first or second modulation format. The OLT is configured to: send, to an ONU, a request to estimate a channel quality based on at least one reference segment modulated according to the second modulation format, the ONU operating according to the first modulation format; receive, from the ONU, a response including an indication of the estimated channel quality; and decide to switch the segments in the downstream transmission assigned to the at least one ONU to the second modulation format based on the response.

14 Claims, 4 Drawing Sheets

(56) References Cited

U.S. PATENT DOCUMENTS

2025/0112725 A1* 4/2025 Xu .......................... H04L 1/20
2025/0219727 A1* 7/2025 Schedelbeck ...... H04B 10/0795

OTHER PUBLICATIONS

ITU-T G.987 (Jun. 2012), "Series G: Transmission Systems and Media, Digital Systems and Networks, Digital sections and digital line system—Optical line systems for local and access networks," International Telecommunication Union, ITU-G-Series Recommendations.
European Communication under Rule 71(3) for European Application No. 22183360.1 mailed Jan. 7, 2025.

* cited by examiner 300
230
231
232
233
A
A
B
102
210
301
302
303
311
312
313

320
321
322
323
331
332
333

MODULATION FORMATS IN OPTICAL NETWORKS

CROSS-REFERENCE TO RELATED APPLICATIONS

The present application claims priority under 35 U.S.C. § 119 to European Patent Application Ser. No. 22/183,360.1, filed Jul. 6, 2022, the entire contents of which are incorporated herein by reference.

TECHNICAL FIELD

Various example embodiments relate to an apparatus and a method for managing modulation formats in an optical network.

BACKGROUND

In passive optical networks, PONs, at least one optical line terminal, OLT, at the network side connects to a plurality of optical network units, ONUs, at the user side by means of optical fibres and splitters, i.e. without active components.

Typically, a single modulation format and forward error correction, FEC, code is used for the downstream transmission to all ONUs connected to an OLT. Alternatively, the downstream traffic in some next-generation PONs can be modulated according to different modulation formats and can be encoded with different FEC codes based on the channel characteristics of the respective ONUs. This can allow using a more performant modulation format and/or FEC code for ONUs that can support this modulation format and/or FEC code.

SUMMARY

The scope of protection sought for various embodiments of the invention is set out by the independent claims. The embodiments and features described in this specification that do not fall within the scope of the independent claims, if any, are to be interpreted as examples useful for understanding various embodiments of the invention.

Amongst others, it is an object of embodiments of the invention to improve determining the support of a modulation format by an optical network unit.

This object is achieved, according to a first example aspect of the present disclosure, by an optical line terminal configured to communicate with optical network units in a passive optical network. Downstream transmission from the optical line terminal to the optical network units is organized in frames comprising segments, wherein a respective segment is modulated according to at least a first modulation format or a second modulation format. The optical line terminal being configured to perform sending, to at least one optical network unit, a request to estimate a channel quality based on at least one reference segment modulated according to the second modulation format, wherein the at least one optical network unit operates according to the first modulation format. The optical line terminal further being configured to perform receiving, from the at least one optical network unit, a response comprising an indication of the estimated channel quality; and deciding to switch the segments in the downstream transmission assigned to the at least one optical network unit to the second modulation format based on the response.

The segments in the downstream transmission frames are modulated according to one or more distinct modulation formats. In other words, the optical network units, ONUs, in the passive optical network, PON, operate according to one or more distinct modulation formats. The first modulation format and the second modulation format may be a respective one of these modulation formats assigned to the ONUs. Alternatively, the first modulation format may be one of the respective modulation formats assigned to the ONUs, and the second modulation format may be another modulation format, i.e. a modulation format that is not assigned to any ONU in the PON.

The at least one ONU estimates the channel quality on request. The channel quality estimation is based on at least one reference segment modulated according to the second modulation format. This allows estimating the channel quality based on a segment, i.e. the at least one reference segment, that is modulated according to the modulation format for which the channel quality is to be estimated, i.e. the second modulation format. This has the advantage that the channel quality can be estimated more accurately and that the estimated channel quality is more reliable, e.g. compared to estimating the channel quality based on a segment modulated according to the modulation format currently assigned to the at least one ONU, i.e. the first modulation format. This has the further advantage that support for the modulation format of the reference segment can be determined even if none of the ONUs in the passive optical network, PON, operate according to said modulation format. It is a further advantage that support for a plurality of modulation formats can be determined.

The optical line terminal, OLT, can decide to switch the modulation format of the segments assigned to the at least one ONU to the second modulation format based on an indication of the estimated channel quality, i.e. the response. The OLT can thus decide to modulate segments assigned to the at least one ONU, i.e. segments in the downstream transmission that comprise data intended for the at least one ONU, according to the second modulation format instead of the first modulation format. Alternatively, the OLT can decide not to switch the modulation format, e.g. when channel quality is insufficient to support the second modulation format. In doing so, the at least one ONU continues to operate according to the first modulation format.

The response thus allows the optical line terminal, OLT, to determine whether the quality of a channel between the OLT and the at least one ONU is sufficient to support communication modulated according to the second modulation format. In other words, the response allows determining whether the segments in the downstream transmission frames assigned to the at least one ONU can be modulated according to the second modulation format. The OLT can thus assign a modulation format to the at least one ONU based on the response to a requested channel quality estimation.

ONUs may be grouped according to their assigned modulation format. In this case, switching the modulation format assigned to the at least one ONU to the second modulation format can include assigning the at least one ONU to a group of ONUs operating according to the second modulation format, or changing the modulation settings of the at least one ONU's group in accordance with the second modulation format.

According to an example embodiment, the second modulation format has a higher modulation order than the first modulation format.

As such, it can be determined whether the at least one ONU can support a modulation format of a higher modulation order. This allows optimizing the bandwidth utilization of ONUs with a high-quality channel, i.e. transmit at higher data rates to those ONUs.

According to an example embodiment, the optical line terminal may further be configured to perform selecting a forward error correction, FEC, code for the segments in the downstream transmission assigned to the at least one optical network unit based on the response.

This allows selecting a FEC code with a higher code rate for ONUs with a higher estimated channel quality. This has the advantage that a higher network throughput, i.e. the rate of successfully delivered data transmissions, can be obtained. This can further allow selecting a FEC code with a lower code rate for ONUs with a lower estimated channel quality. This has the advantage that the error protection can be improved. The FEC code may, for example, be a low density parity check, LD PC, code, a Reed-Solomon code, or a polar code.

According to an example embodiment, the optical line terminal may further be configured to perform including the at least one reference segment within downstream transmission frames during an estimation period.

In other words, the at least one reference segment is provided in the downstream transmission frames while a channel quality is to be estimated, i.e. during the estimation period. The estimation period may, for example, be the period between sending the request to the at least one ONU and receiving the response therefrom. Outside of the estimation period, the reference segment may not be included in the at least one reference segment, thereby limiting the overhead in the downstream transmission.

According to an example embodiment, the at least one reference segment may comprise data intended for at least one other optical network unit operating according to the second modulation format.

A segment in the downstream transmission frame that comprises data for one or more ONUs in the network operating according to the second modulation format may thus, in addition, serve as the reference segment. This allows to further limit the overhead in downstream transmission.

According to an example embodiment, the at least one reference segment may comprise a predetermined sequence.

The predetermined sequence may be a predetermined sequence of synthetic symbols, i.e. dummy symbols that contain no data for the ONUs. These synthetic symbols may be structured according to a fixed pattern or a pseudo-random pattern. The at least one ONU may be aware of the pattern of synthetic symbols in the predetermined sequence. This has the further advantage that estimating the channel quality and/or training the settings of the channel can be performed faster, e.g. by estimating the channel quality without performing FEC decoding on the reference segment.

According to an example embodiment, the at least one reference segment may be located at one or more predetermined positions within downstream transmission frames.

The predetermined positions may be, for example, a fixed position or a position specified according to a standard. Alternatively, the predetermined positions may vary between consecutive downstream transmission frames according to a pattern that is known by the at least one ONU. This pattern may, for example, be communicated to the at least one ONU. In doing so, the at least one ONU can locate the reference segment upon receiving the request to perform channel quality estimation. This has the further advantage that the channel quality can be estimated more efficiently, i.e. without trial-and-error.

According to an example embodiment, the request may further comprise at least one position identifier to locate the at least one reference segment within downstream transmission frames.

The position identifier may, for example, include a segment index that indicates the location of the reference segment within the downstream transmission frame. The position identifier may further include a number of reference segments starting from the segment index if a plurality of successive reference segments are included in the downstream transmission frame. In doing so, the at least one ONU can locate the reference segment upon receiving the request to perform channel quality estimation. This has the further advantage that the channel quality can be estimated more efficiently, i.e. without trial-and-error.

According to an example embodiment, the request may further comprise a modulation format identifier to identify the second modulation format.

In other words, the modulation format identifier indicates the modulation format of the at least one reference segment to the at least one ONU. This allows the OLT to inform the at least one ONU for which modulation format the channel quality estimation is to be performed. This has the further advantage that the modulation format switching of the OLT is scalable, as the OLT can be configured to decide to switch between a plurality of modulation formats.

According to an example embodiment, the request may further trigger training receiver settings of the at least one optical network unit according to the second modulation format based on the at least one reference segment.

As the modulation format of the reference segment differs from the modulation format assigned to the at least one ONU, training the receiver settings, e.g. the equalizer settings, allows the at least one ONU to decode or demultiplex the reference segment upon receiving the request to estimate the channel quality.

According to an example embodiment, the optical line terminal may further be configured to perform omitting data intended for the at least one optical network unit from the downstream transmission frames until receiving the response.

The at least one ONU may thus not be capable to receive and/or decode segments in the first modulation format comprising data intended for it while estimating the channel quality, e.g. during an estimation period. Alternatively, the at least one ONU may continue to receive and/or decode segments in the first modulation format comprising data intended for it while estimating the channel quality. The at least one ONU may communicate its capability to receive and/or decode segments while estimating the channel quality to the OLT prior to the estimating, or this may be specified according to a standard.

According to an embodiment, the indication of the estimated channel quality may comprise an indication of whether the estimated channel quality supports the second modulation format, a signal to noise ratio, SNR, a pre forward error correction bit error rate, pre-FEC BER, a post forward error correction bit error rate, post-FEC BER, a symbol error rate, SER, and/or a codeword error rate, CWER.

The at least one ONU may thus estimate a channel quality metric, i.e. the SNR, the pre-FEC BER, the post-FEC BER, the SER, or the CWER. This channel quality metric may then be communicated to the OLT through the response, allowing the OLT to determine whether the channel quality is sufficient to support the second modulation format. Alternatively, the at least one ONU may determine whether the channel quality is sufficient to support the second modulation format based on the channel quality metrics. An indication of whether the second modulation format is supported, e.g. a true value or a false value, may then be communicated to the OLT by means of the response.

According to an embodiment, the request may be a unicast control message or a broadcast control message.

A unicast control message can allow to request estimating the channel quality for a single ONU, while the broadcast control message can allow to request estimating the channel quality for a plurality of ONUs substantially simultaneously. The control message may, for example, be a physical layer operation and management, PLOAM, message or an ONU management and control interface, OMCI, message. Assigning a modulation format to the at least one ONU, assigning the at least one ONU to a group of ONUs, changing the modulation settings of a group of ONU's, and/or switching the modulation format may also be achieved by transmitting one or more unicast control messages or broadcast control messages.

According to an embodiment, the first modulation format and the second modulation format include one of non-return-to-zero, NRZ, modulation, pulse amplitude modulation, PAM, double square quadrature, DSQ, modulation, quadrature amplitude, QAM, modulation, and phase shift keying, PSK.

For example, the first modulation format may be a non-return-to-zero, NRZ, modulation, and the second modulation format may be a four level pulse amplitude modulation, PAM4, modulation.

According to a second example aspect, an optical network unit is disclosed configured to communicate with an optical line terminal according to the first aspect, wherein downstream transmission from the optical line terminal to one or more optical network units is organized in frames comprising segments; and wherein a respective segment is modulated according to at least a first modulation format or a second modulation format; the optical network unit, operating according to the first modulation format, being configured to perform:

- receiving, from the optical line terminal, a request to estimate a channel quality based on at least one reference segment modulated according to the second modulation format; and
- sending, to the optical line terminal, a response comprising an indication of the estimated channel quality.

According to a third example aspect, a system is disclosed comprising an optical line terminal according to the first aspect and an optical network unit according to a second aspect.

According to a fourth example aspect, a method is disclosed, comprising:

- by an optical line terminal, configured to communicate with optical network units in a passive optical network, wherein downstream transmission from the optical line terminal to the optical network units is organized in frames comprising segments; and wherein a respective segment is modulated according to at least a first modulation format or a second modulation format:
  - sending, to at least one optical network unit, a request to estimate a channel quality based on at least one reference segment modulated according to the second modulation format, wherein the at least one optical network unit operates according to the first modulation format;
- by the at least one optical network unit:
  - sending, to the optical line terminal, a response comprising an indication of the estimated channel quality to the optical line terminal; and
- by the optical line terminal:
  - deciding to switch the segments in the downstream transmission assigned to the at least one optical network unit to the second modulation format based on the response.

BRIEF DESCRIPTION OF THE DRAWINGS

Some example embodiments will now be described with reference to the accompanying drawings.

DETAILED DESCRIPTION OF EMBODIMENT(S)

Figure 1:
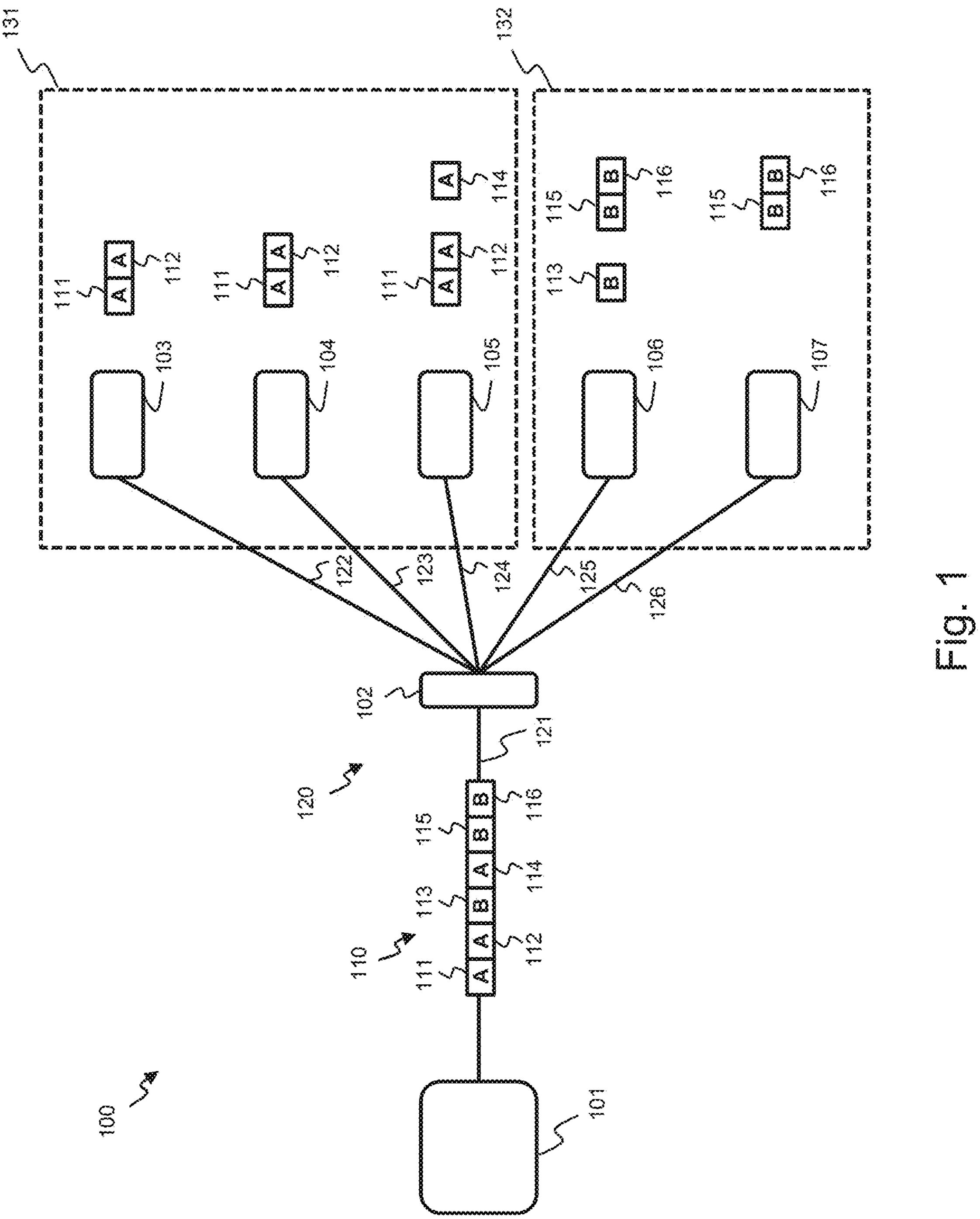
FIG. 1 shows a schematic block diagram of an example passive optical network.

FIG. 1 shows a schematic block diagram of an example point-to-multipoint optical network 100, in particular a passive optical network, PON. The optical network 100 comprises an optical line terminal 101, OLT, and a plurality of optical network units 103, 104, 105, 106, 107, ONUs, connected via an optical distribution network, ODN 120. In this example, the OLT 101 is connected to five ONUs 103, 104, 105, 106, 107, however, the OLT 101 may be coupled to fewer or more endpoints. The ODN 120 has a tree structure comprising one or more optical feeder fibres 121, one or more passive optical splitters/multiplexors 102, and a plurality of optical distribution fibres or drop fibres 122, 123, 124, 125, 126 that connect the splitter/multiplexor 102 to the respective ONUs 103, 104, 105, 106, 107. In the downstream, the passive optical splitter/multiplexor 102 splits the optical signal coming from the OLT 101 into lower power optical signals for the ONUs 103, 104, 105, 106, 107, while in the upstream direction, the passive optical splitter/multiplexor 102 multiplexes the optical signals coming from the ONUs 103, 104, 105, 106, 107 into an optical signal for the OLT 101.

The passive optical network 100 may be a Gigabit passive optical network, G PON, according to the ITU-T G.984 standard, a 10× Gigabit passive optical network, 10G-PON, according to the ITU-T G.987 standard, a 10G symmetrical XGS-PON according to the ITU-T G.9807 standard, a four-channel 10G symmetrical NG-PON2 according to the ITU-T G.989 standard, a 25G-PON, a 50G-PON according to the ITU-T G.9804 standard, or a next generation passive optical network, NG-PON. The passive optical network 100 may implement time-division multiplexing, TDM, or time- and wavelength-division multiplexing, TWDM.

The downstream transmission from the OLT 101 to the ONUs 103, 104, 105, 106, 107 is organized in frames 110 comprising segments 111, 112, 113, 114, 115, 116. These segments may be assigned to one or more of the ONUs 103, 104, 105, 106, 107. The passive optical network 100 may further utilize flexible modulation and/or flexible forward error correction, FEC, in the downstream.

Flexible modulation allows modulating segments 111, 112, 113, 114, 115, 116 in the downstream transmission frames 110 according to one or more modulation formats, e.g. modulation formats A and B as illustrated in FIG. 1. The modulation format that can be assigned to the respective ONUs 103, 104, 105, 106, 107 may depend on characteristics of the channel between the respective ONU and the OLT 101.

The ONUs 103, 104, 105, 106, 107 may further be grouped according to these channel characteristics, e.g. a group 131 of ONUs 103, 104, 105 with bad channels, and a group 132 of ONUs 106, 107 with good channels. Flexible modulation then allows the segments 111, 112, 114 assigned to the ONUs 103, 104, 105 of group 131 to be modulated with a lower modulation order compared to the segments 113, 115, 116 assigned to the ONUs 106, 107 of group 132.

Flexible FEC allows varying the used FEC code between the different ONUs 103, 104, 105, 106, 107 or the different groups 131, 132 of ONUs. As such, ONUs with a good channel can use a FEC code with a higher code rate to obtain a higher throughput, while ONUs with a bad channel can use a FEC code with a lower code rate to obtain a higher margin or better error protection. It can thus be desirable to determine which ONUs in a passive optical network 100 have a sufficiently good channel to support a more performant modulation format and/or a more performant FEC code.

Figure 2:
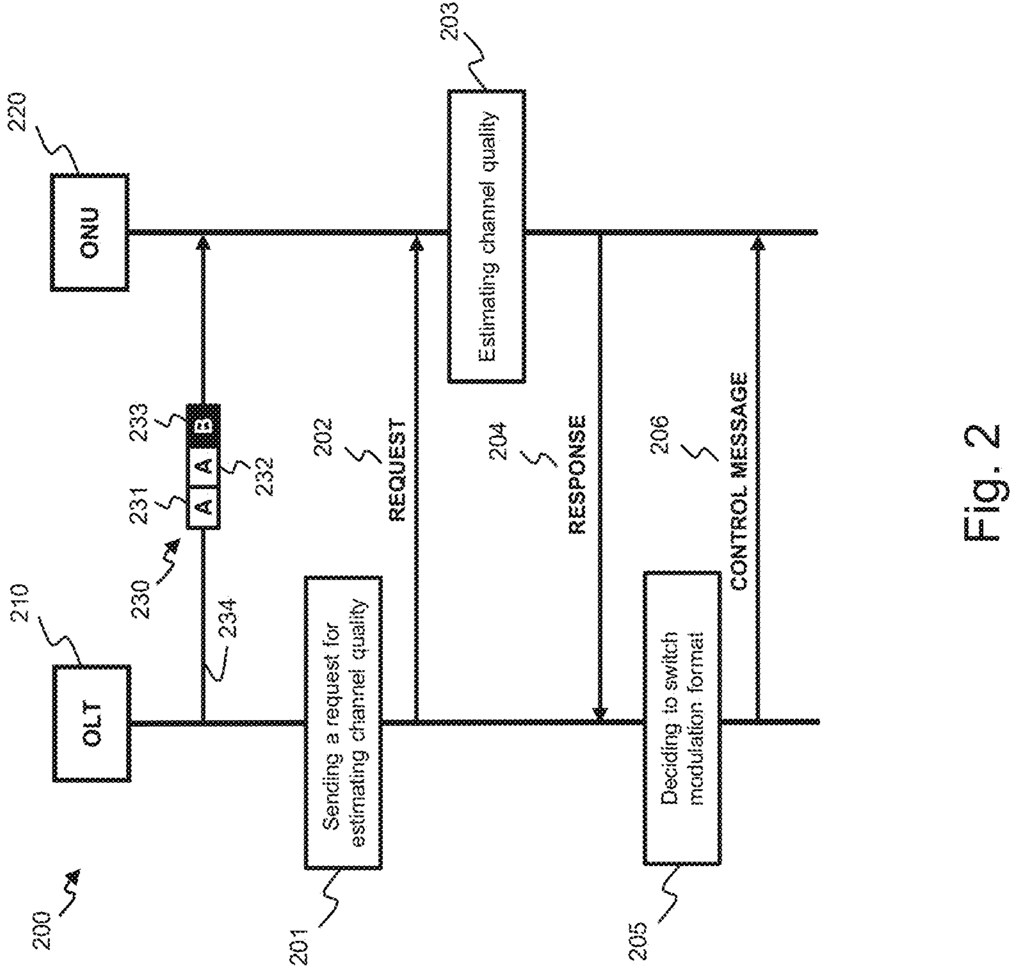
FIG. 2 shows an example embodiment of a sequence diagram of an optical line terminal, OLT, capable of deciding to switch a modulation format assigned to at least one optical network unit, ONU, from a first modulation format to a second modulation format.

FIG. 2 shows a sequence diagram 200 of an example embodiment of an optical line terminal, OLT 210, capable of deciding to switch the modulation format of the segments in the downstream transmission assigned to the at least one ONU 103. The OLT 210 may decide to switch to a modulation format if the channel between the OLT 210 and the at least one ONU 220 can support communication modulated according to said modulation format.

The OLT 210 is configured to communicate with at least one ONU 220 in a passive optical network, e.g. as described in relation to FIG. 1 above. The downstream transmission 234 from the OLT 210 to the at least one ONU 220 is organized in frames 230. The frames 230 may have a fixed time duration and therefore may comprise a fixed number of symbols. The frames 230 comprise segments 231, 232, 233 modulated according to one or more modulation formats. In addition to the fixed time duration of the frames 230, the segments 231, 232, 233 may include a fixed number of symbols. As such, each frame 230 may comprise a fixed number of segments. It will further be apparent that a frame 230 may comprise segments modulated according to a single modulation format, segments modulated according to two different modulation formats, or segments modulated according to more than two different modulation formats.

The at least one ONU 220 operates according to a first modulation format, e.g. non-return-to-zero, NRZ, modulation. The ONU 220 may be configured to process received segments 231, 232, 233 based on receiver settings associated with the first modulation format. As such, the OLT 210 modulates the segments 231, 232 in the downstream transmission frame 230 that are assigned to, i.e. comprising data intended for, the ONU 220 according to the first modulation format.

The ONU 220 may be configured to process all received segments 231, 232, 233 based on these receiver settings, i.e. settings associated to its assigned modulation format. Alternatively, the ONU 220 may be configured to only process segments 231, 232 that are assigned to the ONU 220. In this case, the ONU 220 is aware of which segments 231, 232 in the frame 230 are assigned to it. The ONU 220 may further belong to a group of ONUs, as illustrated in FIG. 1, wherein respective ONUs in the group operate according to the same modulation format. In this case, the ONU may only process segments 231, 232 that are assigned to its group.

The OLT 210 is configured to perform sending 201 a request 202 to ONU 220, e.g. by means of a control message. The request may for example be send, amongst others, periodically, upon request of a user or operator of the passive optical network, or when a higher downstream data rate is desired for ONU 220. The request 202 instructs the ONU 220 to estimate the quality of a channel between the OLT 210 and the ONU 220 if segments modulated according to a second modulation format would be transmitted over that channel. The second modulation format differs from the modulation format used by the ONU 220, i.e. the first modulation format. The second modulation format may have a higher modulation order than the first modulation format. The second modulation format may, for example, be a three-level pulse amplitude modulation, PAM3, a four-level pulse amplitude modulation, PAM4, or a double square quadrature, DSQ, modulation.

It will be apparent that the first and second modulation format may be any modulation format modulated according to a digital modulation method such as, for example, phase-shift keying, PSK, frequency-shift keying, FSK, amplitude-shift keying, ASK, quadrature amplitude modulation, QAM, constellation shaping, constellations using probabilistic constellation shaping, or any other digital modulation method known to the skilled person.

Estimating 203 the channel quality is based on at least one reference segment 233 included in the downstream transmission frame 230, wherein the reference segment 233 is modulated according to the second modulation format. This allows estimating the channel quality based on a segment, i.e. the at least one reference segment 233, that is modulated according to the modulation format for which the channel quality is to be estimated, i.e. the second modulation format. This has the advantage that the channel quality can be estimated more accurately and that the quality estimation is more reliable, e.g. compared to estimating the channel quality based on a segment 231, 232 modulated according to the modulation format currently assigned to the ONU 220, i.e. the first modulation format. It is a further advantage that the channel quality for the modulation format of the reference segment 233 can be determined even if none of the ONUs in a passive optical network operate according to said modulation format.

Estimating 203 the channel quality may comprise estimating or determining a channel quality metric that is indicative for the quality of the channel between the OLT 210 and the ONU 220. Such a channel quality metric may be, for example, a signal to noise ratio, SNR, a pre forward error correction bit error rate, pre-FEC BER, a post forward error correction bit error rate, post-FEC BER, a symbol error rate, SER, and/or a codeword error rate, CWER. This channel quality metric is then communicated to the OLT 210 through a response 204. The response 204 may for example be a control message.

Based on the response 204, the OLT 210 determines whether the quality of the channel between the OLT 210 and the ONU 220 is sufficient to support communication modulated according to the second modulation format. In other words, the response 204 allows determining whether the segments 231, 232, 233 in the downstream transmission frames 230 assigned to ONU 220 can be modulated according to the second modulation format. The channel quality of a channel may be sufficient when, for example, a channel quality metric satisfies a quality threshold, e.g. a pre-FEC BER threshold may be 0.01.

Alternatively, estimating 203 the channel quality may further comprise determining, by the ONU 220, whether the channel quality is sufficient to support the second modulation format based on the determined channel quality metric. For example, the ONU 202 may determine whether the channel quality is sufficient based on the determined channel quality metric, the used FEC code, and the decoder performance of the ONU 220. An indication of whether the second modulation format is supported, e.g. a true value or a false value, may then be communicated to the OLT 210 by means of the response 204.

The OLT 210 is further configured to perform deciding to switch the modulation format of the segments assigned to the ONU 220 to the second modulation format based on the response, i.e. based on one or more channel quality metrics or the indication whether the second modulation format is supported. The OLT 210 can thus decide to switch the modulation format assigned to ONU 220 to the second modulation format. Alternatively, the OLT 210 can decide not to switch the modulation format, e.g. when the channel quality is insufficient to support the second modulation format. In doing so, the at least one ONU 220 continues to operate according to the first modulation format. The OLT can thus assign a modulation format to the ONU 220 based on a response 204 to a requested 202 channel quality estimation 203. Assigning a modulation format to the ONU 220 may, for example, be achieved by sending a control message 206 to the ONU 220.

Switching the segments in the downstream transmission assigned to the ONU 220 to the second modulation format can further include, amongst others, assigning the ONU 220 to a group of ONUs operating according to the second modulation format, or changing the modulation settings of the ONU's 220 group in accordance with the second modulation format.

It will be apparent that horizontal arrows in sequence diagram 200 are merely illustrative for communications 234, 202, 204, 206 that occur between the OLT 210 and the ONU 220 and, as such, do not illustrate the transmission time of these communications. In other words, a substantial transmission time may elapse between transmission and reception of a communication or message 234, 202, 204, 206 between the OLT 210 and the ONU 220.

Figures 3A, 3B:
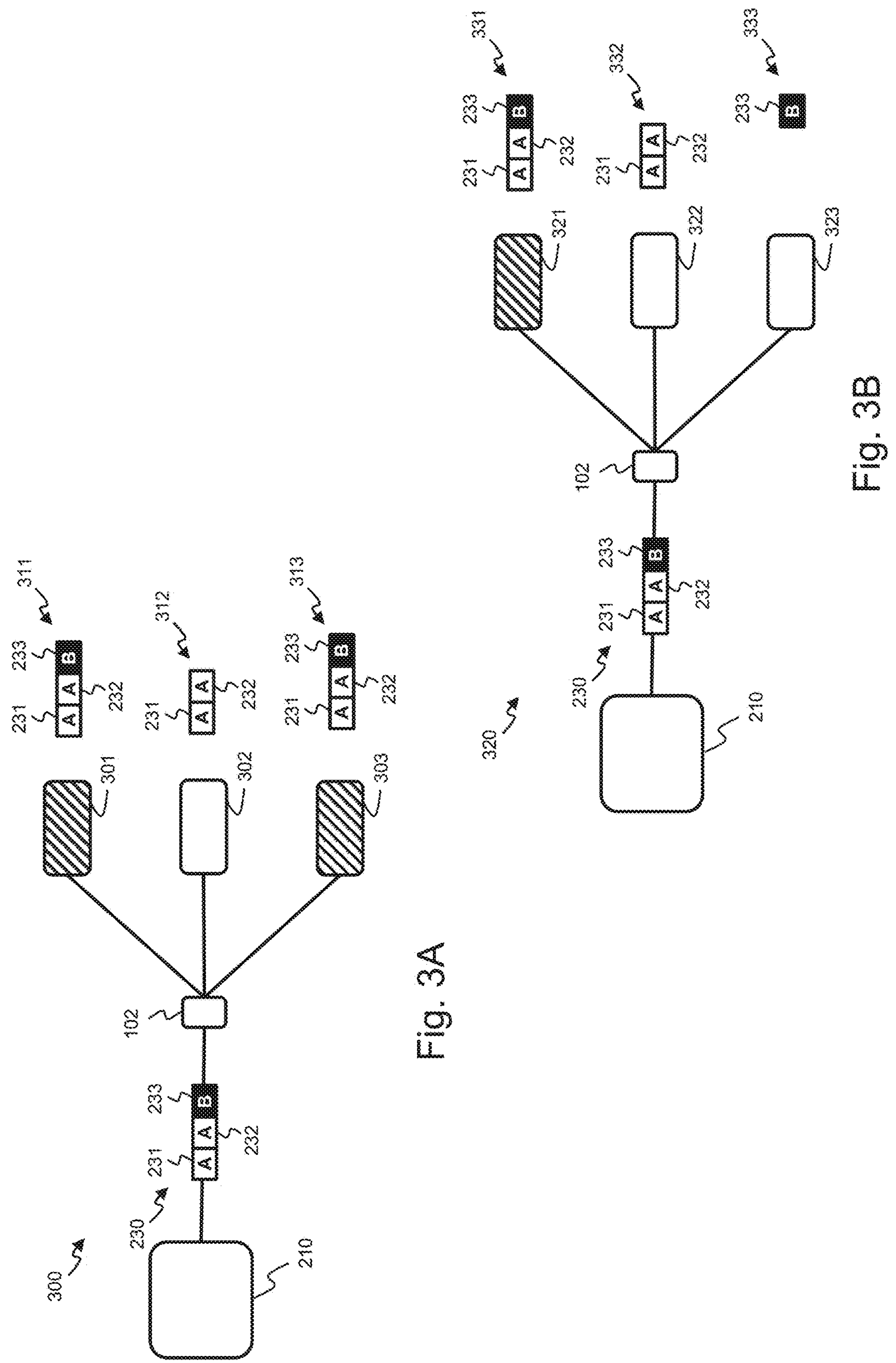
FIG. 3A shows an example embodiment of a passive optical network wherein a plurality of optical network units, ONUs, are requested to estimate their channel quality.
FIG. 3B shows an example embodiment of a passive optical network wherein a reference segment included in a downstream transmission frame comprises data intended for the at least one optical network unit, ONU, that is requested to estimate its channel quality.

FIG. 3A shows an example embodiment of a passive optical network 300 comprising an OLT 210 capable of switching the modulation format assigned to one or more ONUs 301, 302, 303 based on a requested channel quality estimation. The request may be a unicast control message, i.e. a control message send to a single ONU 301, 302, 303. This allows initiating the channel quality estimation for a single ONU 301, 302, 303. For example, only ONU 301 may receive a unicast control message requesting to estimate the channel quality between ONU 301 and the OLT 210 based on the reference segment 233.

Alternatively, the request may be a broadcast control message, i.e. a control message send to a plurality of ONUs 301, 302, 303. This allows initiating the channel quality estimation for a plurality of ONUs 301, 302, 303. For example, both ONU 301 and ONU 303 may receive a broadcast control message requesting to estimate the channel quality between the respective ONUs 301, 303 and the OLT 210 based on the reference segment 233. The control messages may, for example, be a physical layer operation and management, PLOAM, message or an ONU management and control interface, OMCI, message.

It will thus be apparent that the reference segment 233 may be used by one or more ONUs 301, 302, 303 to estimate their channel quality. Alternatively or complementary, a plurality of reference segments may be included in a downstream transmission frame 230 such that one or more ONUs can estimate their channel quality on different reference segments.

The reference segment 233 may comprise a predetermined sequence. The predetermined training sequence may be a sequence of synthetic symbols, i.e. dummy symbols that merely serve the purpose of estimating a channel quality. In other words, the synthetic symbols or dummy symbols do not comprise data intended for any of the ONUs 301, 302, 303 in the network 300. Thus, the predetermined sequence may comprise symbols merely for estimating a channel quality. These synthetic symbols may be structured according to a fixed pattern or a pseudo-random pattern.

The ONU 301, 302, 303 may be aware of the pattern of synthetic symbols in the predetermined sequence. A predetermined pattern of synthetic symbols may, for example, be communicated to the ONU prior to sending the request, be communicated to the ONU together with the request, or may be specified according to a standard. A pseudo-random pattern may, for example, be communicated to the ONU upon sending the request. This has the further advantage that estimating the channel quality and/or training the settings of the channel can be performed faster, e.g. by estimating the channel quality without performing FEC decoding on the reference segment.

Alternatively, a reference segment may comprise data intended for at least one other ONU operating according to the modulation format of the reference segment, i.e. the second modulation format. FIG. 3B shows an example embodiment of a passive optical network 320 wherein the reference segment 233 included in the downstream transmission frame 230 comprises data intended for ONU 323. ONU 323 operates according to the second modulation format. ONU 323 may be aware that segment 233 is assigned to it and thus, only decode segment 233 as illustrated by 333 in FIG. 3B. The OLT 210 may further send a request to ONU 321 to estimate the channel quality based on said segment 233. As such, segment 233 is used to transmit data to ONU 323 and estimate the channel quality for ONU 321. This allows limiting the overhead of the channel quality estimation in downstream transmission.

Figure 4:
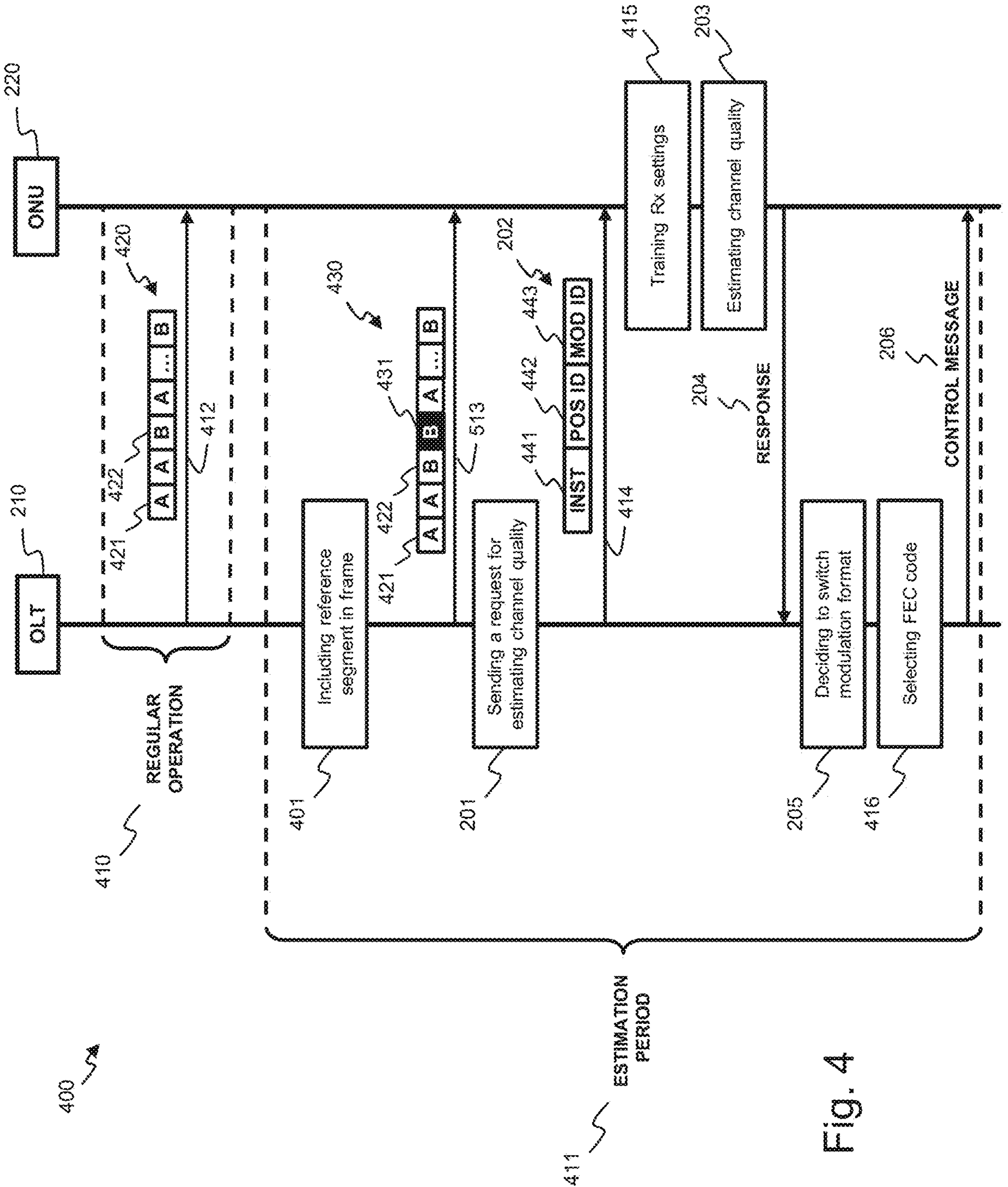
FIG. 4 shows an example embodiment of a sequence diagram of an optical line terminal, OLT, configured to determine whether at least one optical network unit, ONU, operating according to a first modulation format can support communication according to a second modulation format.

FIG. 4 shows a sequence diagram 400 of an example embodiment of an OLT 210 configured to determine whether ONU 220 can support communication according to the second modulation format. During a period of regular operation 410, the OLT 210 may be configured to mix segments 421, 422 for the ONUs, or the groups of ONUs, in each downstream transmission frame 420. These segments 421, 422 are modulated according to the modulation format assigned to the respective ONUs or groups of ONUs.

The OLT 210 may further be configured to perform including 401 at least one reference segment 431 in the downstream transmission frames 430 during an estimation period 411. In other words, a reference segment 431 may only be included in the downstream transmission frames 430 when a channel quality is to be estimated, i.e. during the estimation period 411. This allows further limiting the overhead in downstream transmission 412, 513 as the reference segment 431 is only included when channel quality is to be estimated. The estimation period 411 may, for example, be the period between sending 201 the request 202 to the ONU 220 and receiving the response 204 therefrom, the period between sending 201 the request to the ONU 220 and assigning 206 a modulation format to the ONU 220, or the period between including 401 the reference segment 431 in downstream transmission and assigning 206 a modulation format to the ONU 220. It will be apparent that a plurality of downstream transmission frames 430 that include a reference segment 431 may be transmitted by the OLT 210 during the estimation period 411.

Once the at least one reference segment 431 is being included in the frames 430, the OLT 210 can send 201 a request 202 for estimating the channel quality based on the reference segment 431 to one or more ONUs 220. The request 202 may comprise, amongst others, an instruction 441 to estimate the channel quality, at least one position identifier 442, and/or a modulation format identifier 443.

Alternatively, sending 201 the request 202 may be performed substantially before including 401 the reference segment in the downstream transmission frames 430. In other words, the request 202 may inform the ONU 220 that a reference segment 431 will be included in future downstream transmission frames 430. For example, the request 220 can include an indication that a reference segment 431 will be included in the tenth transmitted frame 430 following the request 202. This allows limiting the number of reference segments missed by the ONU 220, as the ONU 220 can anticipate the reception of the reference segments 431. This has the advantage that overhead in the downstream transmission can further be limited.

The position identifier 442 may, for example, include a segment index that indicates the location of the reference segment 431 within the downstream transmission frame 430. The position identifier 442 may further include a plurality of segment indexes if a plurality of reference segments are included in the frame 430. Alternatively, the position identifier 442 may include a number of reference segments starting from the segment index, if the plurality of reference segments included in the frames 430 are successive. For example, a downstream transmission frame 430 may comprise three successive reference segments located at segment index 3 to 5. In doing so, the ONU 220 can locate the reference segment 431 upon receiving the request 202 to perform channel quality estimation. This has the further advantage that the channel quality can be estimated more efficiently, i.e. without trial-and-error, as the ONU 220 knows where the reference segment 431 is located.

Alternatively, the reference segment 431 may be located at a predetermined position within the downstream transmission frames 430. The predetermined position may be, for example, a fixed position or a position specified according to a standard, e.g. a predetermined segment index. Alternatively, the predetermined position may vary between consecutive downstream transmission frames 430 according to a pattern that is known by the ONU 220. This pattern may, for example, be communicated to the at least one ONU 220 by means of a control message, or may be specified according to a standard. In doing so, the ONU 220 can locate the reference segment 431 upon receiving the request to perform channel quality estimation. This has the further advantage that the channel quality can be estimated more efficiently, i.e. without trial-and-error, as the ONU 220 knows where the reference segment 431 is located.

The modulation format identifier 443 may indicate the modulation format of the reference segment 431, i.e. the second modulation format. This allows the OLT 210 to inform the ONU 220 for which modulation format the channel quality estimation is to be performed. This may, for example, be desired when the OLT 210 can switch between a plurality of modulation formats. As such, in addition to locating the reference segment 431, the ONU 220 can be informed of the modulation format of said reference segment 431. This has the advantage that the modulation format switching of the OLT 210 is scalable.

The request 202 may further trigger training 415 the receiver settings, e.g. the equalizer settings, of the ONU 220 according to the modulation format of the reference segment 431, i.e. the second modulation format. The training may for example include, amongst others, training an equalizer or a clock-and-data recovery algorithm. This training 415 may be based on the reference segment 431. As the modulation format of the reference segment 431 differs from the modulation format assigned to the ONU 220, training 415 the receiver settings allows the ONU 220 to decode or demultiplex the reference segment 431 upon receiving the request to estimate the channel quality.

Hereafter, the ONU 220 may estimate the channel quality based on the reference segment 431, as described in relation to FIG. 2 above. The ONU 220 then sends a response 204 to the OLT 210 with an indication of the estimated channel quality. Based on this indication, the OLT 210 decides to switch the modulation format of the ONU 220 to the second modulation format, i.e. the modulation format of the reference segment.

The OLT 210 may further be configured to perform selecting a FEC code for the segments in the downstream transmission assigned to ONU 220 based on the received response 204. In other words, in addition to assigning a modulation format to the ONU 220, the OLT 210 may also assign a FEC code to the ONU 220.

This allows selecting a FEC code with a higher code rate for ONUs with a higher estimated channel quality. This has the advantage that a higher network throughput can be obtained, i.e. the rate of successfully delivered data transmissions. This can further allow to select a FEC code with a lower code rate for ONUs with a lower estimated channel quality. This has the advantage that the error protection can be improved. The FEC code may, for example, be a low density parity check, LDPC, code, a Reed-Solomon code, or a polar code.

It will further be apparent that selecting 416 the FEC code may be performed before deciding 205 to switch the modulation format, after deciding 205 to switch the modulation format, or substantially simultaneously with deciding 205 to switch the modulation format.

The OLT 210 may further be configured to omit data intended for the ONU 220 from the downstream transmission frames 430 until receiving the response, e.g. during the estimation period 411. The ONU 220 may thus not be capable to receive and/or decode segments 421 assigned to it while estimating the channel quality, e.g. during the period between the request 202 and the response 204. Alternatively, the ONU 220 may continue to receive and/or decode segments assigned to it while estimating the channel quality.

The ONU 220 may communicate its capability to receive and/or decode segments while estimating 203 the channel quality to the OLT 210 prior to the estimating, or this may be specified according to a standard.

After deciding 205 to switch the modulation format and selecting 416 the FEC code, the modulation format and FEC code may be assigned to the ONU 220 by means of a control message. This may complete the estimation period 411. As such, the OLT 210 may stop including reference segments 431 in the downstream transmission frames 430, i.e. return to a period of regular operation 410.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An optical line terminal configured to communicate with optical network units in a passive optical network, wherein downstream transmission from the optical line terminal to the optical network units is organized into frames including segments, wherein a respective segment is modulated according to at least a first modulation format or a second modulation format, and wherein the optical line terminal is configured to:

send, to at least one optical network unit, a request to estimate a channel quality based on at least one reference segment modulated according to the second modulation format, wherein the at least one optical network unit is configured to operate according to the first modulation format, wherein the at least one reference segment is located at one or more selected positions within downstream transmission frames, and wherein the downstream transmission frames further include segments modulated according to the first modulation format;

receive, from the at least one optical network unit, a response including an indication of the estimated channel quality; and decide to switch the segments in the downstream transmission assigned to the at least one optical network unit to the second modulation format based on the response.

2. The optical line terminal according to claim 1, wherein the second modulation format has a higher modulation order than the first modulation format.

3. The optical line terminal according to claim 1, wherein the optical line terminal is further configured to select a forward error correction code for the segments in the downstream transmission assigned to the at least one optical network unit based on the response.

4. The optical line terminal according to claim 1, wherein the optical line terminal is further configured to include the at least one reference segment within downstream transmission frames during an estimation period.

5. The optical line terminal according to claim 1, wherein the at least one reference segment includes data intended for at least one other optical network unit operating according to the second modulation format.

6. The optical line terminal according to claim 1, wherein the at least one reference segment includes a sequence.

7. The optical line terminal according to claim 1, wherein the request includes at least one position identifier to locate the at least one reference segment within downstream transmission frames.

8. The optical line terminal according to claim 1, wherein the request includes a modulation format identifier to identify the second modulation format.

9. The optical line terminal according to claim 1, wherein the request triggers configuration of receiver settings of the at least one optical network unit according to the second modulation format based on the at least one reference segment.

10. The optical line terminal according to claim 1, wherein the optical line terminal is further configured to omit data intended for the at least one optical network unit from downstream transmission frames until receiving the response.

11. The optical line terminal according to claim 1, wherein the indication of the estimated channel quality includes an indication of whether the estimated channel quality supports at least one of the second modulation format, a signal to noise ratio, a pre forward error correction bit error rate, a post forward error correction bit error rate, a symbol error rate, or a codeword error rate.

12. An optical network unit configured to communicate with the optical line terminal according to claim 1 in the passive optical network, wherein downstream transmission from the optical line terminal to one or more optical network units is organized into frames including segments, wherein a respective segment is modulated according to at least a first modulation format or a second modulation format, and wherein the optical network unit, operating according to the first modulation format, is configured to:

receive, from the optical line terminal, a request to estimate a channel quality based on the at least one reference segment modulated according to the second modulation format; and send, to the optical line terminal, a response including an indication of the estimated channel quality.

13. A system comprising:

the optical line terminal according to claim 1; and an optical network unit configured to receive, from the optical line terminal, the request to estimate the channel quality based on the at least one reference segment modulated according to the second modulation format, and send, to the optical line terminal, the response including the indication of the estimated channel quality.

14. A method for communicating between an optical line terminal and optical network units in a passive optical network, wherein downstream transmission from the optical line terminal to the optical network units is organized into frames including segments, wherein a respective segment is modulated according to at least a first modulation format or a second modulation format, and wherein the method comprises:

sending, by the optical line terminal to at least one optical network unit, a request to estimate a channel quality based on at least one reference segment modulated according to the second modulation format, wherein the at least one optical network unit operates according to the first modulation format, wherein the at least one reference segment is located at one or more selected positions within downstream transmission frames, and wherein the downstream transmission frames further include segments modulated according to the first modulation format;

sending, by the at least one optical network unit to the optical line terminal, a response including an indication of the estimated channel quality to the optical line terminal; and deciding, by the optical line terminal, to switch the segments in the downstream transmission assigned to the at least one optical network unit to the second modulation format based on the response.

* * * * *